United States Patent

Wissner

[15] 3,659,493
[45] May 2, 1972

[54] ROCKET RETAINING MECHANISM FOR LAUNCHER TUBES

[72] Inventor: Irving E. Wissner, Santa Monica, Calif.
[73] Assignee: Hitco, Los Angeles, Calif.
[22] Filed: Jan. 16, 1970
[21] Appl. No.: 3,346

[52] U.S. Cl.............................89/1.807, 89/1.814, 89/1.816
[51] Int. Cl.............................................................F41f 3/04
[58] Field of Search...............89/1.806, 1.807, 1.816, 1.814, 89/1.808

[56] References Cited

UNITED STATES PATENTS

| | | | |
|---|---|---|---|
| 2,848,925 | 8/1958 | Hood | 89/1.806 |
| 3,412,640 | 11/1968 | Nash | 89/1.807 X |
| 2,460,929 | 2/1949 | Goff | 89/1.807 |
| 2,938,431 | 5/1960 | Dixon | 89/1.807 |
| 3,059,543 | 10/1962 | Manz et al. | 89/1.807 |

Primary Examiner—Samuel W. Engle
Attorney—Victor G. Laslo

[57] ABSTRACT

Rocket launcher-tube rocket retaining mechanism of the detent type for rockets with a latching rim having a circumferential groove and foldable stabilizing fins. A latching arm is rotatably mounted at one of its ends to a mounting plate secured over an opening in the tube sidewall, spring means urging the free end of the arm into the tube. The arm defines an inwardly extending latching tab spaced forward of a rear stop projection on the mounting plate, this space accommodating the rocket latching rim with the latching tab projecting into the rocket circumferential groove. The free end of the latching arm is oriented such that the blast issuing from an ignited rocket will impinge against it and rotate it radially outward to withdraw the latching tab from the rocket circumferential groove and free the rocket for forward flight. The shape of the latching tab provides positive latching, a forward movement tendency of the rocket causing an increase in the latching force due to an over-center action.

8 Claims, 7 Drawing Figures

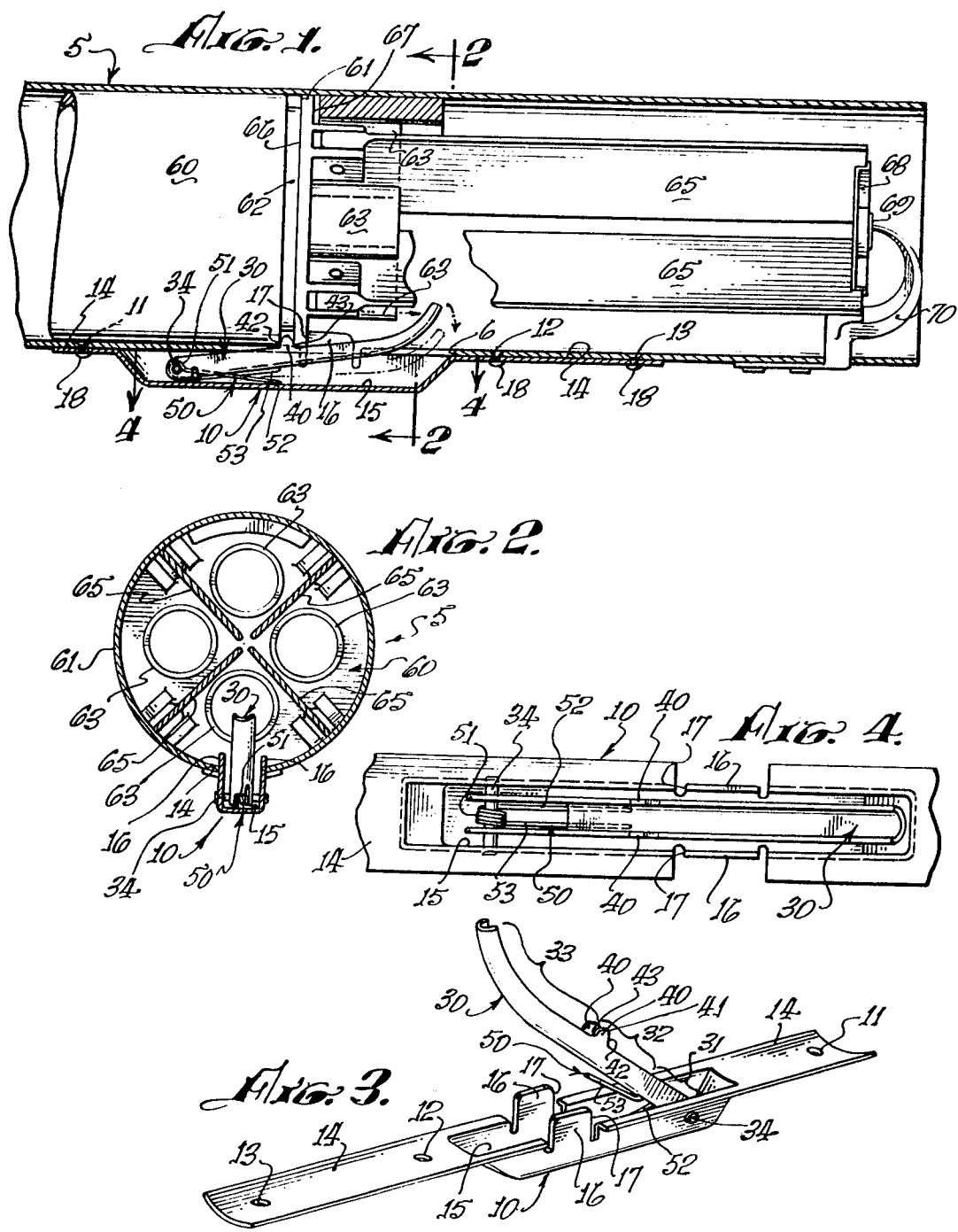

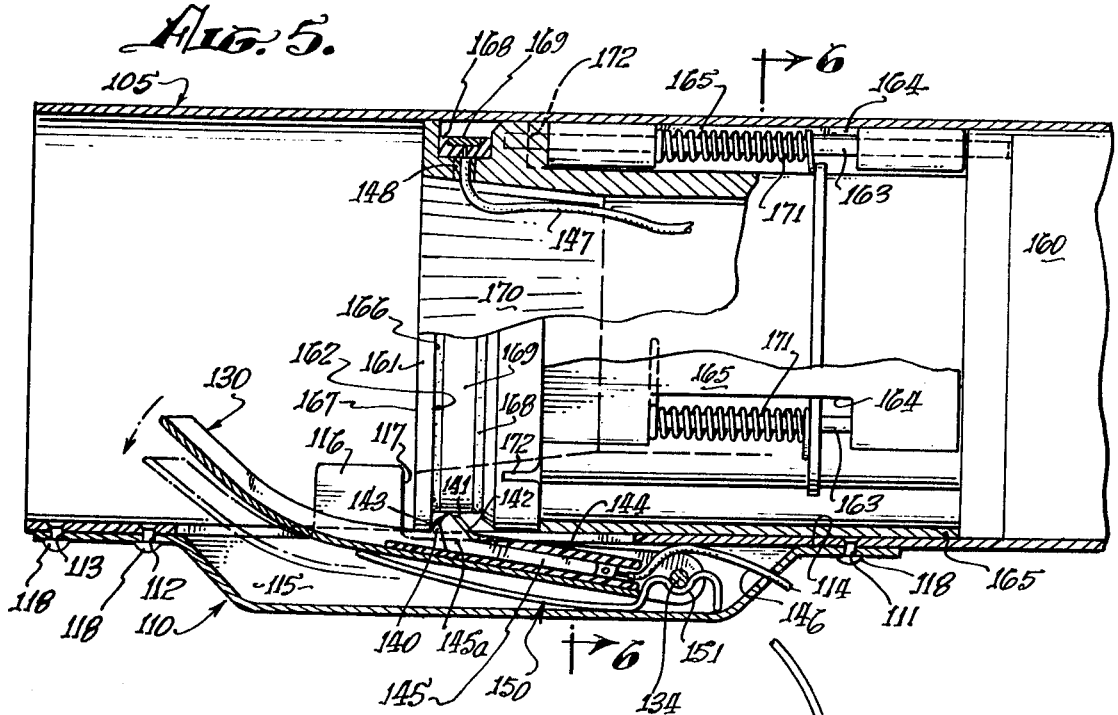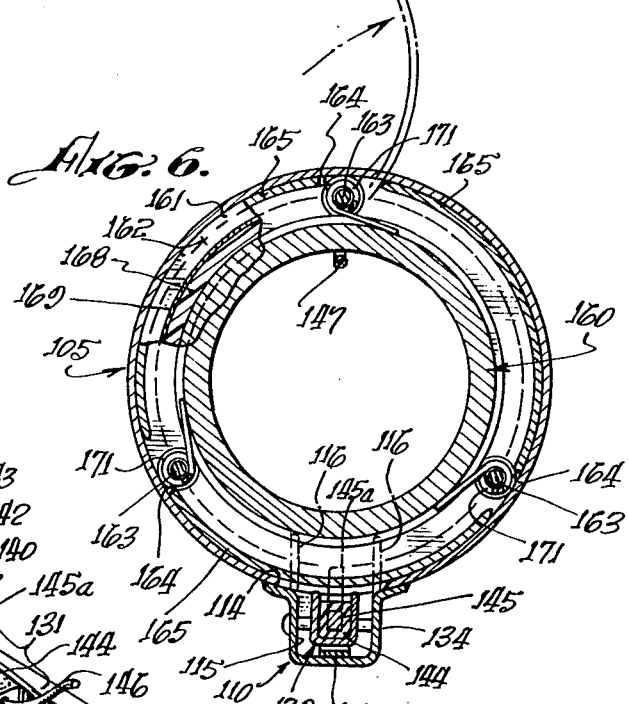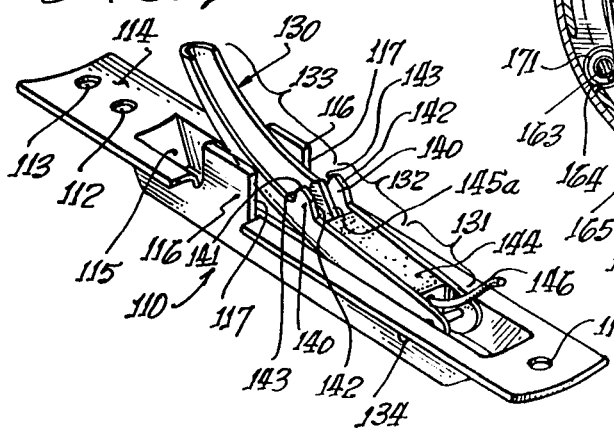

ROCKET RETAINING MECHANISM FOR LAUNCHER TUBES

BACKGROUND OF THE INVENTION

In the current state of rocket weaponry, certain types of rockets are provided at their rear ends with a latching rim adjacently behind a circumferential groove and ahead of a rearwardly opening nozzle or nozzles, the launches for these rockets usually including a plurality of clustered launcher tubes, the launcher tubes being provided with latching mechanisms which engage the rocket latching rim to securely retain the rockets in the tubes and release them upon firing.

Latching mechanisms have been developed around the use of an elongate latching arm secured at one of its ends to the rear portion of the launcher tube, a biasing force urging its free end inwardly into the tube. The arm defines an inwardly extending latching tab for engagement with the rocket circumferential groove to secure the rocket in the tube with the free end of the arm adjacently behind a rocket nozzle. When the rocket motor is ignited, the ensuing blast from the nozzle impinges against the free end of the latching arm to rotate it outwardly against the biasing force and withdraw the latching tab from the rocket circumferential groove, thereby freeing the rocket for forward flight.

In the typical prior art latching arm embodiments the biasing force is provided by the resiliency of the latching arm itself, sometimes in conjunction with a reinforcing leaf spring running along the outside of the latching arm and secured by the same fastening means which mounts the arm to the tube. Typical prior art mounting comprises riveting or otherwise securing the mounting end of the latching arm directly to the tube sidewall, the free end of the latching arm projecting through a suitably sized opening in the tube sidewall.

However, these prior art latching mechanisms, although sound in principle, are not without their attendant disadvantages. Reliance upon arm resiliency significantly affects not only reliability and useful life, but also reproducibility to any but the broadest tolerances and parameters. Since the latching arm is directly exposed to the rocket blast, the heat and ablation resistance characteristics of the latching arm material become important, as well as its resiliency over the wide temperature range encountered. Furthermore, surface hardness characteristics and costs are also factors to be considered. Obviously, compromises are necessary, which compromises themselves result in serious degradation of device reliability and useful life. Due to the necessary curvature of the latching arm and bending relief notches at the point of curvature, it is extremely difficult to consistently reproduce latching arms having a similar degree of resiliency so that the same deflecting force would properly operate each arm, even when an auxiliary leaf spring is used.

Another factor affecting device reliability is the latching tab configuration of the prior art latching arms wherein the latching tab surfaces operate to limit both forward and rearward movement of a carried rocket, any rotation of the latching arm thereby causing movement of both of these limited surfaces. Radially inward movement of the latching arm resulting from a forward movement of the rocket (before firing) would tend to apply a forward directed pressure against the rearward surface of the rocket latching rim, the pressure applied to the latching arm by the rearward surface of the rocket latching rim upon a rearward movement of the rocket tending toward a radially outward or disengaging movement of the latching arm. The present invention is directed toward an improved rocket latching mechanism obviating the aforementioned disadvantages.

SUMMARY OF THE INVENTION

Although the present invention rocket latching mechanism utilizes the aforementioned general operating principle wherein an elongate latching arm is secured at one of its ends, a biasing force urging its free end inwardly into the tube, the blast from an ignited rocket being utilized to provide the desired latch disengaging force, a different form of structure results in an improved device which provides a significant advance in the art. The present invention rocket retaining detent mechanism comprises three main components; a mounting plate, a rigid latching arm and separate spring means. The mounting plate is secured to the rocket tube covering the opening in the tube sidewall through which the latching arm projects, the plate having an inwardly facing depression extending axially alongside a radially inward projection defining a forward facing abutting surface projecting inwardly into the tube for engaging the rearward surface of the rocket latching rim. The latching arm is mounted at one of its ends within the mounting plate depression, the intermediate portion of the latching arm defining an inwardly extending latching tab with a curved camming surface extending between a rearwardly inclined forward edge and a generally radial rear edge, the rear edge of the latching tab being forwardly spaced from the abutting surface of the mounting plate projection a distance slightly greater than the thickness of the rocket latching rim. The spring means providing the radially inward biasing force for the latching arm is disposed within the mounting plate depression, and in presently preferred embodiments comprises a leaf spring or a torsion coil spring.

The configuration of the latching tab forward and rearward edges and camming surface function so that as a rocket is inserted into the tube the rocket latching rim will engage the rearwardly inclined forward edge of the latching tab to rotate the latching arm radially outward as the rim slides across the latching tab forward edge and camming surface. As the latching rim leaves the camming surface and passes over the rear edge of the latching tab, the pressure of the spring means urges the latching arm radially inwardly into the rocket circumferential groove to retain the rocket in a predetermined carrying position. When the rocket is in this predetermined position further rearward displacement of the rocket in the tube is prevented by engagement of the rearward surface of the rocket latching rim with the forward facing abutting surface of the mounting plate's radially inward projection, forward displacement of the rocket in the tube being limited by engagement of the latching rim forward surface with the rear edge of the latching tab.

The use of a rotatably mounted, rigid latching arm and separate spring results in more positive and reliable action and enables optimization of operating and material characteristics for each application. Latch disengaging force can be accurately adjusted by determination of the spring tension, the spring material being selected on the basis of operating environments and desired service life. Since the latching arm is of a rigid type its temperature and surface hardness characteristics can be optimized, resiliency no longer being required. The aforementioned spring and latching arm parameters and characteristics can now be specified to quite close tolerances and the latching mechanism "customized" for various applications on a mass reproduction basis.

Removal of the rocket rearward displacement limiting function (when the rocket is in the predetermined carrying position) from the moveable latching arm results in a more positive and reliable latching action. Rearward movement of a rocket from the determined carrying position does not cause rotation of the latching arm, rearward movement now being limited by the abutting surface on the latching plate projection, nor does forward movement of the rocket result in a forward directed force being applied to the rearward surface of the rocket latching rim.

Removal of the rocket rearward displacement limiting function from the latching arm also enables a positive latching due to the over-center action resulting from the radially inward rotation of the latching arm caused by the pressure exerted by the forward surface of the rocket latching rim upon the generally radial rear edge of the latching tab upon forward movement of the rocket prior to firing, the radially inward rotation of the latching arm increasing the latching pressure. Because of this self-latching feature, much less spring biasing is required than in the prior art mechanisms wherein the spring biasing force is relied upon to maintain proper latch engagement upon axial movements of the rocket before launching. Upon firing of the rocket and subsequent radially outward rotation of the latching arm caused by the force from the exhaust jet, the rocket latching rim will engage the latching tab camming surface, forward movement of the rocket then causing the latching rim to override the latching tab by forcing it outward as the rim slides across the tab camming surface, thereby completing the latch release.

It is therefore the primary object of the present invention to provide rocket launcher tube rocket retaining mechanisms of improved operation and reliability.

It is another object of the present invention to provide rocket retaining mechanisms of the type stated, characterized by increased useful life and economical reproducibility to significantly closer tolerances.

Further objects and advantages of the invention will become apparent from the following description and drawings in which presently preferred embodiments are illustrated by way of example, the scope of the invention being indicated in the accompanying claims.

BRIEF DESCRIPTION OF THE DRAWING

FIG. 1 of the drawing shows an elevation view, in cross-section, of the rear portion of a rocket launcher tube, including one presently preferred embodiment of the present invention detent mechanism, with a 2.75 inch FFAR type rocket loaded into position in the tube;

FIG. 2 is a view taken along the line 2—2 of FIG. 1;

FIG. 3 is a perspective view of the detent mechanism shown in FIG. 1;

FIG. 4 is a view taken along the line 4—4 of FIG. 1;

FIG. 5 is an elevation view, in cross-section, of the rear portion of a rocket launcher tube, including another presently preferred embodiment of the present invention detent mechanism, with a MK 66 type rocket loaded into position in the tube;

FIG. 6 is a view taken along the line 6-6 of FIG. 5; and

FIG. 7 is a perspective view of the detent mechanism shown in FIG. 5.

DESCRIPTION OF THE PREFERRED EMBODIMENTS

Turning first to FIG. 3 of the drawing, there is shown a perspective view of the presently preferred embodiment of a detent mechanism for use with the current 2.75 inch FFAR rocket configuration. The three main components of the detent mechanism; a mounting plate, a latching arm and a spring, are generally indicated by the respective reference numerals 10, 30 and 50.

The mounting plate 10 is of elongate configuration, having an inner surface 14 transversely concave in accordance with the curvature of the outer wall of the rocket tube to which it is to be secured. The mounting plate is provided with suitable mounting holes 11, 12 and 13 near its ends to accommodate rivets or other suitable fasteners for securing the plate to the rocket tube. The central portion of mounting plate 10 defines an axially extending depression 15 which faces inwardly when the mounting plate is secured to a rocket tube, i.e., depression 15 is a radially outward depression. A pair of transversely aligned lugs 16 are positioned one on either side of depression 15, the lugs projecting from the concave inner surface 14. Each of the lugs 16 has a transverse edge which defines an abutting surface 17 for engaging the rearward surface of the rocket latching rim, as will be hereinafter explained.

The latching arm 30 generally defines a straight end portion 31, an intermediate portion 32 and a curved end portion 33. The arm 30 is rotatably mounted at its straight end portion 31 to the mounting plate 10 within depression 15 by means of a transverse pin 34. Projecting from the intermediate portion 32 are a pair of transversely spaced latching tabs 40, each tab defining a curved camming surface 41 extending between an inclined edge 42 and a perpendicular edge 43, the edge 43 being somewhat shorter than the edge 42. The end portion 33 is curved away from the mounting plate 10 so as to project concavely inward into the rocket tube, as indicated in FIG. 1.

FIG. 1 shows the rear end portion of a rocket launcher tube 5 loaded with a 2.75 inch FFAR rocket, the rocket being generally indicated by the reference numeral 60. The rocket 60 defines a circumferential latching rim 61 adjacently behind a circumferential groove 62, the latching rim having flat forward and rearward surfaces respectively indicated by the reference numerals 66 and 67. Four radially spaced rearwardly opening nozzles 63 project rearwardly from the latching rim between four foldable stabilizing fins 65, as can best be seen in FIGS. 1 and 2. The fins are pivotally mounted at their forward ends, and retained in their retracted position of FIG. 1 by means of a retaining plate 68 fitted to the extreme rear ends of the fins, the retainer plate being formed from a suitable dielectric material and being centrally provided with a rearwardly spacing electrical contact button 69. An arcuate shaped electrical contact 70 is mounted to the tube 5, the contact button 69 being urged thereagainst when the rocket is in the carrying position shown in FIG. 1.

The latching arm is biased radially inwardly by means of the spring 50, which in the presently preferred form is a torsion coil spring. As shown in FIGS. 1-4 a coil 51 is provided with elongate end portions 52 and 53, the end portion 52 bearing against the bottom of mounting plate depression 15, the end portion 53 bearing against the lower surface of the latching arm 30.

The detent mechanism is secured to the rocket tube 5 by means of rivets 18 fitted through the mounting holes 11, 12 and 13, with the depression 15 in register with aperture 6 of the launcher tube. In this position the lugs 16 and the free end of the latching arm 30 project into the inside of the tube.

The latching tabs 40 are positioned on the arm intermediate portion 32 such that when the arm is in the position shown in FIG. 1, the space between the forward facing abutting surfaces 17 of the mounting plate lugs 16 and the rear edges 43 of the latching tabs 40 is slightly greater than the thickness of the rocket latching rim 61, the latching rim being accommodated within this space. As can also best be seen in FIG. 1, the latching tabs 40 are dimensioned to fit within the rocket circumferential groove 62, the rear edges 43 being in a substantially radial orientation when the latching mechanism is engaged to maintain the rocket in its carrying position within the rocket tube.

When the launcher tube 5 is empty, the spring 50 biases the curved end portion of the latching arm 30 away from the depression 15 and lugs 16 to the approximate position shown in FIG. 3. Upon loading of the rocket 60 into the launcher tube 5, by inserting it into the forward end of the tube and urging it rearwardly therethrough, the rear portion of the rocket will contact the inwardly projecting latching arm 30 and rotate it radially outward as the rocket is pushed 2, into the tube. Should the rocket happen to be aligned so that one of the fins 65 strikes the latching arm 30 as the rocket is being inserted into the tube the arm will prevent complete insertion of the rocket into the tube. In such case, the tube is merely withdrawn a small amount, slightly rotated and then reinserted, whereupon the fins will straddle the latching arm 30 and the mounting plate lugs 16. However, orientation of each of the launcher tubes in a cluster so that the latching arms project vertically upwards, as illustrated in FIG. 0, obviates the necessity for a specific rocket orientation during loading, it being merely necessary to rotate the rocket so that the rear edges of the fins are in a "X" orientation.

As the rocket is inserted into the tube in the approximate alignment shown in FIG. 2, the latching rim rearward surface 67 will contact the latching tab inclined edges 42 and begin radially outward rotation of arm 30, further rearward displacement of the rocket in the tube then continuing the radially outward rotation of the latching arm as the latching rim 61 slides across the camming surfaces 41, this deflected position of the latching arm being shown in phantom in FIG. 1. The pressure of spring 50 rotates the latching arm radially inwardly as the latching rim passes over the camming surfaces 41 and the rear edges 43 of the latching tabs 40 to urge the latching tabs into the rocket circumferential groove 62 to retain the rocket in the predetermined carrying position, as shown in FIG. 1. In this predetermined carrying position engagement of the rearward surface 67 of the rocket latching rim with the forward facing abutting surfaces 17 of the mounting plate lugs prevents further rearward displacement of the rocket in the tube, forward displacement of the rocket in the tube being limited by engagement of the rocket latching rim forward surface 66 with the then radially oriented rear edges 43 of the latching tabs. The radial orientation of the rear edges, acting in conjunction with the somewhat lower mounting of the pin 34 which determines the latching arm axis of rotation, provides the aforementioned over-center action wherein forward displacement of the rocket, before firing, will cause tighter latching engagement due to further radially inward rotation of the latching arm resulting from the pressure of the latching rim against the rear edges 43 of the latching tabs.

In the rocket carrying position, the rearwardly extending curved end portion 33 of the latching arm projects into the tube adjacent and to the rear of one of the nozzles, the arm being oriented such that the blast issuing from an ignited rocket will impinge against the curved end portion 33 to rotate the latching arm radially outward, thereby withdrawing the latching tabs from the rocket circumferential groove and freeing the rocket for forward flight. Upon ignition of the rocket motor the latching tab will restrain forward movement of the rocket until the motor exhaust exerts sufficient force against the latching arm curved end portion 33 to cause the arm to begin to rotate radially outward. At the beginning of radial outward movement of the latching arm the rocket will be moved very slightly rearwardly due to pressure of the rear edges 43 of the latching tabs against the rocket latching rim. Further rotation of the latching arm will bring the curved camming surfaces 41 to bear against the forward surface 66 of the latching rim, whereupon the rocket will begin to move forward and override the latching tabs due to the curved configuration of the camming surfaces.

For proper latch release, the curved end portion 33 of the latching arm should present a transverse surface for the rocket blast to impinge against. For convenience in manufacturing, it is presently preferred to fabricate the latching arm 30 as an integral structure forming a generally channel-shaped cross section as shown, with the latching tabs on the channel flanges and with the channel web portion presenting the desired transverse surface for impingement of the rocket blast.

Turning now to FIGS. 5, 6 and 7 of the drawing there are shown various views of the present invention rocket latching mechanism adapted for use in a launcher for rockets of the so-called MK 66 type, these rockets having a single, central nozzle, curved stabilizing fins hinged along a longitudinal edge, and an electrical contact ring ring disposed within the rocket circumferential groove. FIG. 5 shows the rear end portion of a rocket launcher tube 105 loaded with a MK 66 rocket, the rocket being generally indicated by the reference numeral 160. The rocket 160 defines a circumferential latching rim 161 adjacently behind a circumferential groove 162, the latching rim having flat forward and rearward surfaces respectively indicated by the reference numerals 166 and 167. Set into the surface of circumferential groove 162 is an annulus 168 of electrical insulating material, an electrical contact ring 169 being set into the surface of the insulating annulus whereby the contact ring 169 is insulated from the rocket body.

A single, rearwardly opening rocket nozzle 170, having a rifled inner surface, terminates at the rearward surface 167 of the rocket latching rim. Three folding fins 165 of curved cross-section, are hingedly mounted to the rocket body ahead of the rocket latching rim 161 and groove 162. Thus, unlike the 2.75 inch FFAR rocket, the latching rim of the MK 66 rocket is at the extreme rear end of the rocket. One logitudinal edge of each of the fins 165 is provided with an elongate notch 164, the fin being hingedly mounted by means of a pin 163 extending through the notch. Each of the fins is normally spring-loaded to an open position (indicated in phantom in FIG. 6) by means of a torsion coil spring 171. For loading into the rocket tube the fins are folded circumferentially inward against the spring pressure, the fins being urged rearwardly so that each fin rear edge enters a retaining slot 172 in the rocket body. The fins are held in this closed position while loading the rocket into the tube, the inner tube walls then preventing the fins from flying open. Rearward movement of the fins into the retaining slots 172 causes compression of the coil springs 171 so that when the rocket leaves the tube upon firing, logitudinal expansion of the coil springs urge the fins forward, the fins flying open when they clear the retaining slots 172.

Since electrical connections to the MK 66 rocket must be made to its circumferential groove, an appropriate electrical contact is carried by the latching arm of the detent mechanism. As in the previous embodiment, the detent mechanism generally comprises a mounting plate, a latching arm and a spring, these components being generally indicated by the respective reference numerals 110, 130 and 150. The mounting plate 110 is similar to the mounting plate 10 of the hereinabove described embodiment, the mounting plate 110 being of an elongate configuration and having an inner surface 114 transversely concave in accordance with the curvature of the outer wall of the rocket tube. The mounting plate is provided with suitable mounting holes 111, 112 and 113 near its ends to accommodate rivets 118 which secure the plate to the rocket 105. The central portion of mounting plate 110 defines an axially extending, radially outward depression 115. A pair of transversely aligned lugs 116 are positioned one on either side of depression 115, the lugs projecting from the concave inner surface 114. Each of the lugs 116 has a transverse edge which defines an abutting surface 117 for engaging the rearward surface of the rocket latching rim.

The latching arm 30 generally defines a straight end portion 131, an intermediate portion 132 and a curved end portion 133. The arm 130 is rotatably mounted at its straight end portion 131 to the mounting plate 110 within depression 115 by means of a transverse pin 134. Projecting from the intermediate portion 132 are a pair of transversely spaced latching tabs 140, each tab defining a curved camming surface 141 extending between an inclined edge 142 and a perpendicular edge 143, the edge 143 being somewhat shorter than the edge 142. The end portion 133 is curved away from the mounting plate 110 so as to project concavely inward into the rocket tube, as indicated in FIG. 5.

Latching arm 130 is of generally channel-shaped cross-section having an electrical contact 145 partially encapsulated in an insulating body 144 disposed within the channel at the straight end portion 131. The contact 145 defines an angular end portion 145a projecting from the insulating body 144 and extending between and slightly higher than the latching tabs so that it will contact the rocket electrical contact ring 169 when the rocket is in its predetermined carrying position, as shown in FIG. 5. An insulated electrical lead 146 has one of its ends connected to the electrical contact 145, the other of its ends projecting from the end of the insulating body 144 for connection to external electrical circuitry. Another electrical lead 147 has one of its ends connected to the rocket contact ring 169, the lead extending through an insulating bushing 148 into the interior of the rocket nozzle for connection to the rocket firing circuitry.

The latching arm is biased radially inwardly by means of the spring 150, which in this embodiment is in the form of an elongate leaf spring having an irregularly curved end portion 151 for mounting of the spring by snapping it under the transverse pin 134, whereby the end of the spring is compressed between the transverse pin and the bottom of the mounting plate depression 115. The free end of the leaf spring bears against the lower surface of the latching arm 130, the spring 150 functioning in the same manner as the spring 50 in the hereinabove described embodiment.

As before, the latching tabs are positioned on the latching arm intermediate portion such that when the rocket is in the predetermined position in the tube, the space between the forward facing abutting surfaces of the mounting plate lugs and the rear edges of the latching tabs is slightly greater than the thickness of the rocket latching rim, the latching rim being accommodated within this space. As can be seen in FIG. 5, the latching tabs 140 are dimensioned to fit within the rocket circumferential groove 162, the rear edges 143 being in a substantially radial orientation when the latching mechanism is engaged to maintain the rocket in its predetermined carrying position.

Since the rearward surface 167 also defines the rear extremity of the rocket, no special care need be taken to rotationally orient the rocket upon loading into the tube. As the rocket is loaded into the tube and pushed rearwardly, the rearward surface 167 will contact the inclined forward edges 142 of the latching tabs 140 to rotate the latching arm radially outward, the latching rim then sliding across the forward edges 142, the projecting tip of contact 145 and the camming surfaces 141. The pressure of spring 150 rotates the latching arm radially inwardly as the latching rim passes over the camming surfaces 141 and the rear edges 143 of the latching tabs 140 to urge the latching tabs into the rocket circumferential groove 162 to retain the rocket in the predetermined carrying position.

In the rocket carrying position, the rearwardly extending curved end portion 133 of the latching arm projects into the tube so that the blast which issues from nozzle 170, upon ignition of the rocket, will impinge against the curved end portion 133 to rotate the latching arm radially outward, thereby withdrawing the latching tabs from the rocket circumferential groove and freeing the rocket for forward flight. The functioning of the latching mechanism is basically identical to that hereinabove described with respect to the embodiment shown for use with the 2.75 inch FFAR rocket.

The presently preferred latching arm form, wherein the channel-shaped cross section provides high strength and rigidity, is relatively easily and economically fabricable by a stamping operation, as is the presently preferred form of the mounting plate. Other latching arm forms incorporating high strength, the specified latching tab configuration, and the transverse "paddle" surface of the arm's free end will also be apparent, as will application of the present invention principles to the retention of other classes and types of rockets. By flaring out the curved end of the latching arm to increase the transverse "paddle" surface, proper release can be assured for rockets of lower impulse. Thus, although the invention has been described with a certain degree of particularity, it is understood that the foregoing description has been by way of example only and that other combinations and arrangements of parts will be within the scope of the invention. For example, although it is convenient to form two latching tabs on the latching arm in accordance with the presently preferred embodiment, proper latching functioning could be achieved with an arm embodiment utilizing only a single latching tab. It is presently preferred to utilize two of the lugs 16 on the mounting plate instead of just one since the two spaced apart lugs present excessive rotation of the 2.75 inch FFAR rocket while being carried in the launching tube.

Thus there has been described improved rocket launching retaining mechanisms which feature improved reliability and useful life, while being simply and inexpensively fabricable.

What is claimed is:

1. In a rocket launcher tube for carrying and launching an elongate tubular rocket having a circumferential latching rim adjacently behind a circumferential groove and ahead of a rearwardly opening nozzle, an improved rocket retaining detent mechanism comprising:

a. A mounting plate secured to said tube covering an axially extending aperture in the tube sidewall, said plate having a radially outward depression extending axially and a radially inward projection defining a forward facing abutting surface projecting inwardly into said tube for engaging the rearward surface of the rocket latching rim;

b. An elongate, rigid latching arm defining an intermediate portion extending between a straight end portion and an angular end portion, means rotatably mounting said arm at one of its end portions to said mounting plate within said depression and with its other end portion extending rearwardly and projecting inwardly into said tube, said intermediate portion defining an inwardly extending latching tab with a curved camming surface extending between a rearwardly inclined forward edge and a generally radial rear edge, the rear edge of said latching tab being forwardly spaced from the abutting surface of said mounting plate projection a distance at least as great as the thickness of the rocket latching rim; and c. Spring means disposed within the mounting plate depression for urging said latching arm radially inwardly, so that as a rocket is inserted into said tube the rocket latching rim will engage the rearwardly inclined forward edge of said latching tab to rotate the latching arm radially outward as the rim slides across the latching tab forward edge and camming surface, the pressure of said spring means rotating said latching arm radially inwardly as said latching rim passes over said camming surface and the rear edge of the latching tab to urge the latching tab into the rocket circumferential groove and retain said rocket in a predetermined position wherein engagement of the rearward surface of the rocket latching rim with the forward facing abutting surface of the mounting plate radially inward projection prevents further rearward displacement of the rocket in the tube and wherein forward displacement of the rocket in the tube is limited by engagement of the latching rim forward surface with the rear edge of said latching tab, the rearwardly extending end portion of said latching arm projecting into the tube adjacent and to the rear of the nozzle when the rocket is in the predetermined position and oriented such that the blast issuing from an ignited rocket will impinge thereagainst to rotate said latching arm radially outward to withdraw said latching tab from the rocket circumferential groove and free the rocket for forward flight.

2. An improved detent mechanism as defined in claim 1, wherein said latching arm is mounted at its straight end portion to said mounting plate and with its angular end portion extending rearwardly.

3. An improved detent mechanism as defined in claim 2, wherein the angular end portion of said latching arm is curved, said latching arm being mounted with its curved end portion projecting concavely inwardly into said tube.

4. An improved detent mechanism as defined in claim 1, wherein said mounting plate defines a radially outward depression extending axially between two radially inward projections, each defining a forward facing abutting surface projecting inwardly into said tube for engaging the rearward surface of the rocket latching rim, and wherein the rear edge of said latching tab is forwardly spaced from the abutting surfaces of said mounting plate projections a distance slightly greater than the thickness of the rocket latching rim.

5. An improved detent mechanism as defined in claim 4, wherein at least the intermediate portion of said latching arm is of generally channel-shaped cross section, each flange of the channel defining a substantially identical inwardly extending latching tab with a curved camming surface extending between a rearwardly inclined forward edge and a generally radial edge, the rear edge of each of said latching tabs being forwardly spaced from the abutting surface of said mounting plate projection a distance slightly greater than the thickness of the rocket latching rim.

6. An improved detent mechanism as defined in claim 1, further including electrical contact means mounted to said latching arm and insulated therefrom.

7. An improved detent mechanism as defined in claim 5 further including electrical contact means disposed within the latching arm channel and projecting between and slightly more inwardly than said latching tabs for engagement with an electrical contact in the rocket circumferential groove when the rocket is in said predetermined position.

8. An improved detent mechanism as defined in claim 7, wherein said electrical contact means is partially encapsulated in a body of electrical insulating material in the straight end portion of said latching arm to electrically insulate said electrical contact means from said latching arm.

* * * * *